(12) United States Patent
Delage et al.

(10) Patent No.: US 7,376,305 B2
(45) Date of Patent: May 20, 2008

(54) ECHELLE GRATINGS WITH LOW POLARIZATION DEPENDENT LOSS (PDL) USING METAL COATING ON THE REFLECTING FACETS ONLY

(75) Inventors: Andre Delage, Ottawa (CA); Boris Lamontagne, Gatineau (CA); Kokou Dossou, Newtown (AU); Siegfried Janz, Ottawa (CA); Pavel Cheben, Ottawa (CA); Lynden Erickson, Cumberland (CA); Dan-Xia Xu, Gloucester (CA); Sylvain Charbonneau, Cumberland (CA)

(73) Assignee: Enablence Inc., Kanata, Ontario (CA)

( * ) Notice: Subject to any disclaimer, the term of this patent is extended or adjusted under 35 U.S.C. 154(b) by 70 days.

(21) Appl. No.: 10/496,488

(22) PCT Filed: Nov. 26, 2002
(Under 37 CFR 1.47)

(86) PCT No.: PCT/CA02/01797

§ 371 (c)(1),
(2), (4) Date: Mar. 10, 2006

(87) PCT Pub. No.: WO03/046619

PCT Pub. Date: Jun. 5, 2003

(65) Prior Publication Data
US 2006/0209411 A1    Sep. 21, 2006

(51) Int. Cl.
*G02B 6/34* (2006.01)
*G02B 5/18* (2006.01)
*G02B 27/44* (2006.01)
*H01L 21/00* (2006.01)

(52) U.S. Cl. .............. 385/37; 385/14; 385/129; 385/130; 359/566; 359/571; 359/572; 438/29; 438/31; 438/32

(58) Field of Classification Search ............. 385/14, 385/37, 31, 129, 130, 131, 132, 141; 359/571, 359/572, 566; 438/31, 32, 29
See application file for complete search history.

(56) References Cited

U.S. PATENT DOCUMENTS

| 3,237,508 | A | | 3/1966 | Keller et al. ............. 359/572 |
| 4,715,027 | A | | 12/1987 | Mahapatra et al. ......... 370/3 |
| 5,937,113 | A | | 8/1999 | He et al. .................. 385/11 |
| 5,999,318 | A | * | 12/1999 | Morton et al. ............ 359/572 |
| 6,400,509 | B1 | * | 6/2002 | Sappey et al. ............ 359/571 |
| 6,449,096 | B1 | * | 9/2002 | Fabiny et al. ............ 359/571 |
| 6,995,910 | B2 | * | 2/2006 | Fabiny et al. ............ 359/571 |
| 2006/0209411 | A1 | * | 9/2006 | Delage et al. ............ 359/566 |

FOREIGN PATENT DOCUMENTS

WO    WO 01/77738 A2    10/2001

\* cited by examiner

Primary Examiner—Brian M Healy
(74) Attorney, Agent, or Firm—Teitelbaum & MacLean; Neil Teitelbaum; Doug MacLean

(57) ABSTRACT

An Echelle grating has alternate first (1a) and second (1b) sets of facets (1). The first set of facets (1a) is operative to reflect incident light (4) for diffraction and the second set of facets (1b) extends between adjacent facets of the first set (1a). Only the first set of facets (1a) is metallized to enhance reflection. The second set of facets (1b) is left unmetallized. This configuration reduces polarization dependent loss (PDL).

7 Claims, 2 Drawing Sheets

ECHELLE GRATINGS WITH LOW POLARIZATION DEPENDENT LOSS (PDL) USING METAL COATING ON THE REFLECTING FACETS ONLY

BACKGROUND OF THE INVENTION

1. Field of the Invention

This invention relates to the field of photonics, and in particular to Echelle gratings with low Polarization Dependent Loss (PDL) for use as multiplexers and demultiplexers in wavelength division multiplex communications systems.

2. Description or Related Art

Echelle gratings can be used as a diffractive element in wavelength multiplexer or demultiplexer devices. To improve the reflecting efficiency of a silica based grating, it is known to deposit a metallic layer, typically aluminum, on the grating facets. Unfortunately, the diffraction efficiency using this technique is highly sensitive to the state of polarisation of the incident light. A metallized echelle grating exhibits a high Polarisation Dependent Loss (PDL) as described in D. Chowdhury, "Design of Low-Loss and Polarization-Insensitive Reflection Grating-based Planar Demultiplexers", IEEE Journal of Selected Topics in Quantum Electronics, Vol. 6, No 2, pp. 233-239, 2000; and R. Petit, Ed., "Electromagnetic Theory of Gratings", New York, Springer-Verlag, 1980, the contents of which are incorporated herein by reference.

Since standard optical fibers do not maintain-polarization during transmission, it is important that the responses of optical devices vary as little as possible with the state of polarisation.

An object of the invention is to reduce the polarization dependent insertion loss of an Echelle or like diffraction grating.

SUMMARY OF THE INVENTION

Accordingly the present invention provides an Echelle grating comprising alternate first and second sets of facets, said first set of facets being operative to reflect incident light for diffraction and said facets of said second set extending between adjacent facets of said first set. In accordance with the invention, only said first set of facets is metallized to enhance reflection and said second set of facets is left substantially unmetallized.

From physical considerations and by carrying out simulations, the inventors have discovered that by metallizing only the reflecting facets of the grating instead of both facets, as is shown in the prior art, the grating polarization dependent loss can be dramatically reduced.

The metallization of only the reflecting facets can be obtained by directional deposition or etching. Experimental measurements have been found to be in agreement with the simulations.

In another aspect the invention provides a method of making an echelle grating, comprising the steps of forming a plurality of facets on a slab waveguide; and selectively depositing a metal layer only on alternate facets that are operative to reflect incident light for diffraction.

BRIEF DESCRIPTION OF THE DRAWINGS

The invention will now be described in more detail, by way of example only, with reference to the accompanying drawings, in which.

DETAILED DESCRIPTION OF THE INVENTION

Figure 1:
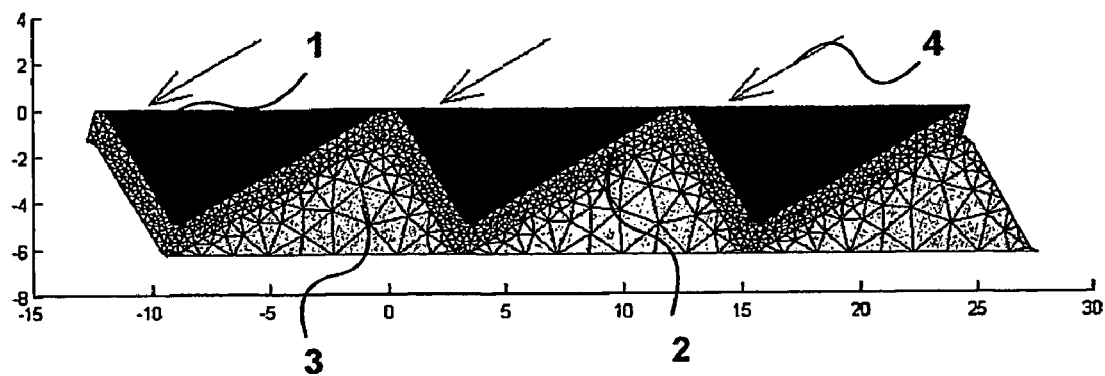
FIG. 1 is a cross section of an echelle grating metallized in accordance with the prior art.

The echelle grating shown in FIG. 1 comprises a plurality of blazed grating facets 1 that are formed, typically by etching, on a silica-based slab waveguide in a manner known per se. The grating has a metallic layer 2, typically aluminum, deposited on the grating facets 1 to enhance reflectivity. Incident light represented by arrows 4 is reflected off the metallic facets 2 within the slab waveguide. Air filled right angled voids 3 are present on the far side of the grating facets.

Figure 2:
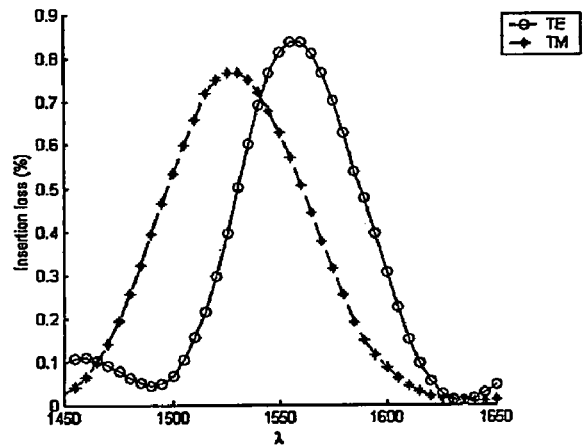
FIG. 2 is a simulated plot for the device shown in FIG. 1 showing that there is a shift between the efficiency (insertion loss) of TM and TE polarization.

As will be seen in the simulation shown in FIG. 2, the diffraction efficiency using this prior art technique is highly sensitive to the state of polarisation of the incident light. This is apparent from the separation of the curves showing the TE and TM modes of polarization. This sensitivity to the state of polarization leads to high polarization dependent loss.

Figure 3:
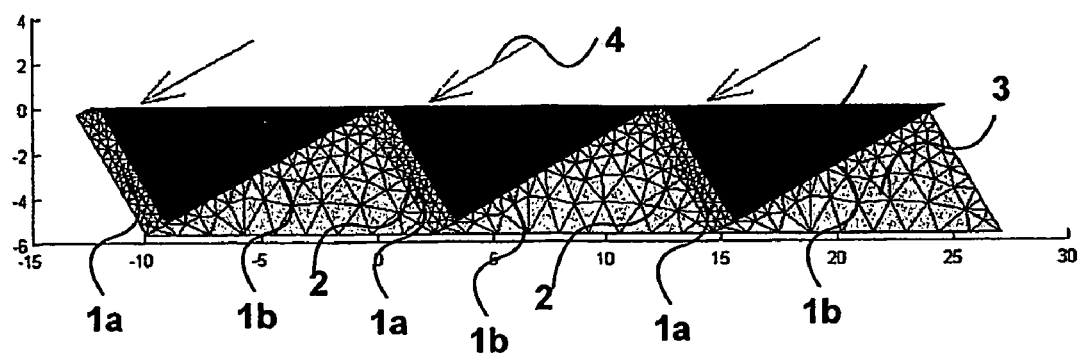
FIG. 3 is a cross section of an echelle grating metallized in accordance with the principles of the invention.

FIG. 3 shows an echelle grating in accordance with the principles of the invention. In this arrangement only first set of facets 1a facing the incident light 4, and which serve to reflect the incident light 4, is metallized. The first set of facets 1a is disposed to reflect the incident light back in order to form the diffraction grating. A second set of non-reflecting connecting facets 1b located between the reflecting facets 1a is not metallized. The second set of facets may of course be reflective, but they do not participate in reflecting incident light for diffraction purposes.

Figure 4:
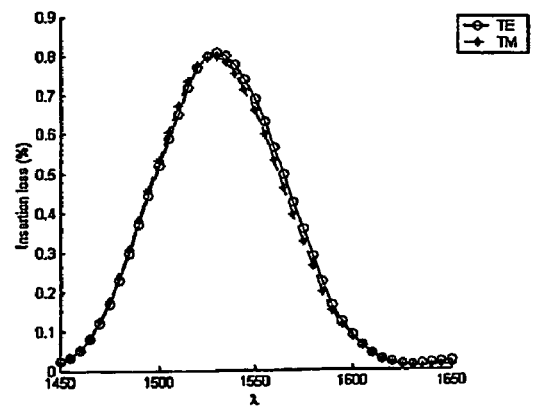
FIG. 4 is a simulated plot for the device shown in FIG. 3 showing the efficiencies of TE and TM polarization are very close.

A comparison of the curves shown in FIG. 4 with those shown in FIG. 2 shows that the grating becomes much less sensitive to the state of polarization when only the reflecting facets are metallized. The efficiencies of TE and TM polarization are very close. It will thus be seen that when the metallization is removed from the connecting facets, the PDL is dramatically reduced.

Figure 5:
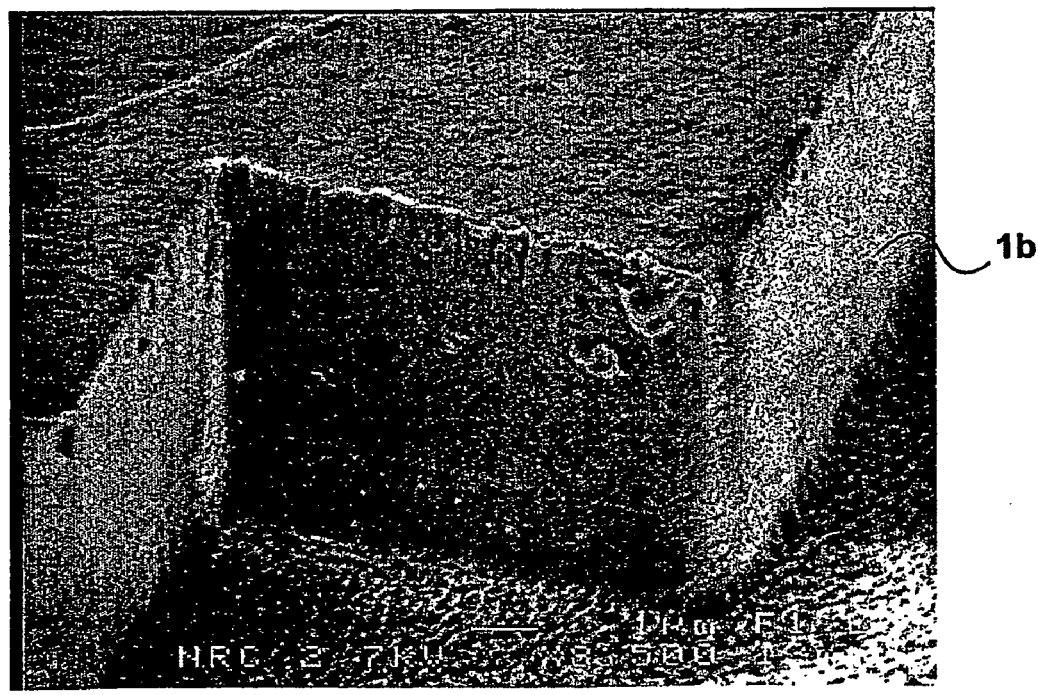
FIG. 5 is an image of an echelle grating constructed in accordance with the invention.

FIG. 5 is an image of an actual echelle grating. The metal, in this example aluminum, was first deposited on both facets and then the metal on the right-hand side facet 1b (non-reflecting) was removed by directional etching (Chemically Assisted Ion Beam Etching (CAIBE)) so as to leave only left-hand side facet 1a well metallized. Alternatively, the metallization can be achieved by directional deposition.

An echelle grating differs from a conventional grating (called an echelette). An echelle grating is coarse (i.e., it has fewer grooves per millimeter than an echelette) and is used at high angles in high diffraction orders. The virtue of an echelle lies in its high efficiency and low polarization effects over large spectral intervals. Together with high dispersion, this leads to compact, high-resolution instruments. The invention is primarily application to echelle gratings, but could also be applied to an echelette grating.

Of course, one skilled in the art will be aware of many variations within the scope of the appended claims. For example, it would be possible to leave some reflecting facets unmetallized without affecting the basic principle of operation of the invention, namely that the reflecting facets are metallized and that the intervening non-reflecting facets are unmetallized. By "non-reflecting", it is understood that the intervening facets do not participate in the operation of the grating in that they are not disposed to face the incident light, although it will be appreciated that they may inherently form a reflecting surface. It will also be appreciated that a small amount residual metallization may remain on the non-reflecting facets without significantly affecting the operation of the invention as described.

We claim:

1. An Echelle grating integrated with a slab waveguide comprising alternate first and second sets of facets etched on to an exposed end surface of said slab waveguide defining angled recesses filled with air at the end of said slab waveguide,
    wherein said first set of facets are operative to reflect incident light for diffraction;
    wherein said facets of said second set of facets extend between adjacent facets of said first set, and
    wherein only said first set of facets is metalized to enhance reflection, and said second set of facets is unmetallized.

2. An Echelle grating as claimed in claim 1, wherein said first set of facets is metalized with an aluminum layer.

3. A method of making an echelle or echelette grating, comprising the steps of:
    a) forming a plurality of facets on a slab waveguide defining angled recesses filled with air at the end of said slab waveguide; and
    b) selectively depositing a metal layer only on alternate facets that are operative to reflect incident light for diffraction.

4. A method as claimed in claim 3, wherein step b) includes depositing said metal layer on all said facets, and then selectively removing metal from alternate facets between said facets operative to reflect incident light for diffraction.

5. A method as claimed in claim 4, wherein said metal layer is removed from alternate facets by selective etching.

6. A method as claimed in claim 3, wherein step b) includes depositing said metal layer on alternate facets by directional deposition.

7. A method as claimed in claim 3, wherein said metal comprises aluminum.

* * * * *